(12) United States Patent
Bouillet

(10) Patent No.: US 7,583,802 B2
(45) Date of Patent: Sep. 1, 2009

(54) METHOD FOR USING A SYNCHRONOUS SAMPLING DESIGN IN A FIXED-RATE SAMPLING MODE

(75) Inventor: Aaron Reel Bouillet, Noblesville, IN (US)

(73) Assignee: Thomson Licensing, Boulogne Billancourt (FR)

( * ) Notice: Subject to any disclaimer, the term of this patent is extended or adjusted under 35 U.S.C. 154(b) by 755 days.

(21) Appl. No.: 10/542,433

(22) PCT Filed: Jan. 20, 2004

(86) PCT No.: PCT/US2004/001581

§ 371 (c)(1),
(2), (4) Date: Jul. 14, 2005

(87) PCT Pub. No.: WO2004/066355

PCT Pub. Date: Aug. 5, 2004

(65) Prior Publication Data

US 2006/0192895 A1    Aug. 31, 2006

Related U.S. Application Data

(60) Provisional application No. 60/440,734, filed on Jan. 17, 2003.

(51) Int. Cl.
*H04N 7/167* (2006.01)
(52) U.S. Cl. ............... 380/225; 380/220; 380/221; 380/219; 348/571; 375/261
(58) Field of Classification Search ............ 380/219, 380/225
See application file for complete search history.

(56) References Cited

U.S. PATENT DOCUMENTS

| | | | |
|---|---|---|---|
| 3,943,346 A | 3/1976 | Urkowitz et al. | |
| 5,588,025 A | 12/1996 | Strolle et al. | |
| 5,878,088 A * | 3/1999 | Knutson et al. | 375/324 |
| 5,943,369 A | 8/1999 | Knutson et al. | |
| 6,128,357 A | 10/2000 | Lu et al. | |
| 2001/0048723 A1* | 12/2001 | Oh | 375/261 |
| 2002/0110376 A1* | 8/2002 | MacLean et al. | 396/429 |
| 2002/0154620 A1 | 10/2002 | Azenkot et al. | |

OTHER PUBLICATIONS

Search Report Dated Aug. 30, 2004.
European Search Report Dated Aug. 14, 2006.

* cited by examiner

*Primary Examiner*—Longbit Chai
(74) *Attorney, Agent, or Firm*—Robert D. Shedd; Joseph J. Opalach; Brian J. Cromarty

(57) ABSTRACT

The present application generally relates to apparatuses such as television signal processing apparatus that process radio frequency signals. More specifically, the present application is particularly useful in integrated circuits that must combine circuitry operating in a synchronous-sampling mode that must be adapted for use with a fixed rate sampling mode application. According to an exemplary embodiment, the television signal processing apparatus comprises a source of a fixed rate digital signal, signal processing circuitry operating in a synchronous-sampling mode wherein the signal processing circuitry comprises a signal representing a symbol rate, and an interpolator for processing the fixed rate digital signal to yield samples at the symbol rate.

20 Claims, 5 Drawing Sheets

METHOD FOR USING A SYNCHRONOUS SAMPLING DESIGN IN A FIXED-RATE SAMPLING MODE

This application claims the benefit, under 35 U.S.C. § 365 of International Application PCT/US04/01581, filed Jan. 20, 2004, which was published in accordance with PCT Article 21(2) on Aug. 5, 2004 in English and which claims the benefit of U.S. provisional patent application No. 60/440,734, filed Jan. 17, 2003.

FIELD OF THE INVENTION

The present application generally relates to apparatuses such as television signal processing apparatus, that process radio frequency signals. More specifically, the present application is particularly useful in integrated circuits that combine circuitry operating in a synchronous-sampling mode that must be adapted for use with a fixed rate sampling mode application.

BACKGROUND OF THE INVENTION

The present application generally relates to apparatuses such as television signal processing apparatus, that process radio frequency signals. More specifically, the present application is particularly useful in integrated circuits that must combine circuitry operating in a synchronous-sampling mode that must be adapted for use with a fixed rate sampling mode application.

Modern signal processing apparatus typically include signal processing circuitry for processing a multitude of signal formats, such as NTSC, ATSC, QAM, or satellite signals. Such a signal processing apparatus typically includes various components such as a tuner for selecting a particular signal or channel from a plurality of signals or channels received by the apparatus. To process digital signals, such as ATSC or satellite signals, the signal processing circuitry, and in particular the tuner, must perform these functions with high-speed digital circuitry. Some digital signal processing apparatus operate in a synchronous-sampling mode, where the A/D converter takes samples coincident with the digital symbol locations. The digital symbols, and subsequently the sampling frequency are calculated by the demodulator and a rate control signal is output from the demodulator to control the sampling rate of the A/D. It is also possible to take samples using an A/D converter at a fixed time intervals.

It is often a major design change in terms of time and expense to convert a design originally intended to operate in synchronous-sampling mode to operate in a fixed-rate sampling mode. This is primarily due to the requirement for an enable signal to be provided to all of the memory elements in the design. An enable signal is required throughout the design to identify when processing is to proceed since the demodulator is running at a high rate and not every clock signal is accompanied by a digital symbol. A thorough knowledge of the original design is usually required to effectuate the design change and re-verification is required to be carried out. In situations of design reuse, it would be advantageous to introduce a preprocessing block that can convert the fixed rate samples to synchronous samples with requiring the necessity of an enable line.

Furthermore, in digital signal processing applications, there are typically many different clocks used to drive the processing circuitry. These clocks are typically derived from a phase-locked loop (PLL). When the data is gathered through an A/D converter, using the PLL output to clock the A/D converter can degrade its performance as high speed A/D converters are sensitive to clock jitter. When an external clock is used to drive the A/D converter, a synchronization problem arises because of the unknown phase between the A/D clock and the PLL output clock. Previously, designers have used clock resynchronizers or back to back flip flops on the reference clock and PLL clock lines. This solution is based on the assumption that a "bad phase" occurs only some of the time. However, if the system starts up in the "bad phase" it will continue to operate constantly at the bad phase. This results in the data latching and putting the system into an unstable state. Therefore the robustness of the back-to-back flip flop approach is questionable. It is desirable to have an AND clock to be used by the digital signal processing circuitry that is synchronized to the PLL output clock to facilitate latching the AND output and preventing problems associated with clock jitter.

SUMMARY OF THE INVENTION

In accordance with an aspect of the present invention, a signal processing apparatus signal processing apparatus comprising a source of a fixed rate digital signal, a signal processor operating in a synchronous-sampling mode for producing a control signal representing a symbol rate, and an interpolator responsive to the control signal for processing the fixed rate digital signal to yield samples at the symbol rate.

BRIEF DESCRIPTION OF THE DRAWING

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION OF THE PREFERRED EMBODIMENT

The exemplifications set out herein illustrate preferred embodiments of the invention, and such exemplifications are not to be construed as limiting the scope of the invention in any manner.

Figure 1:
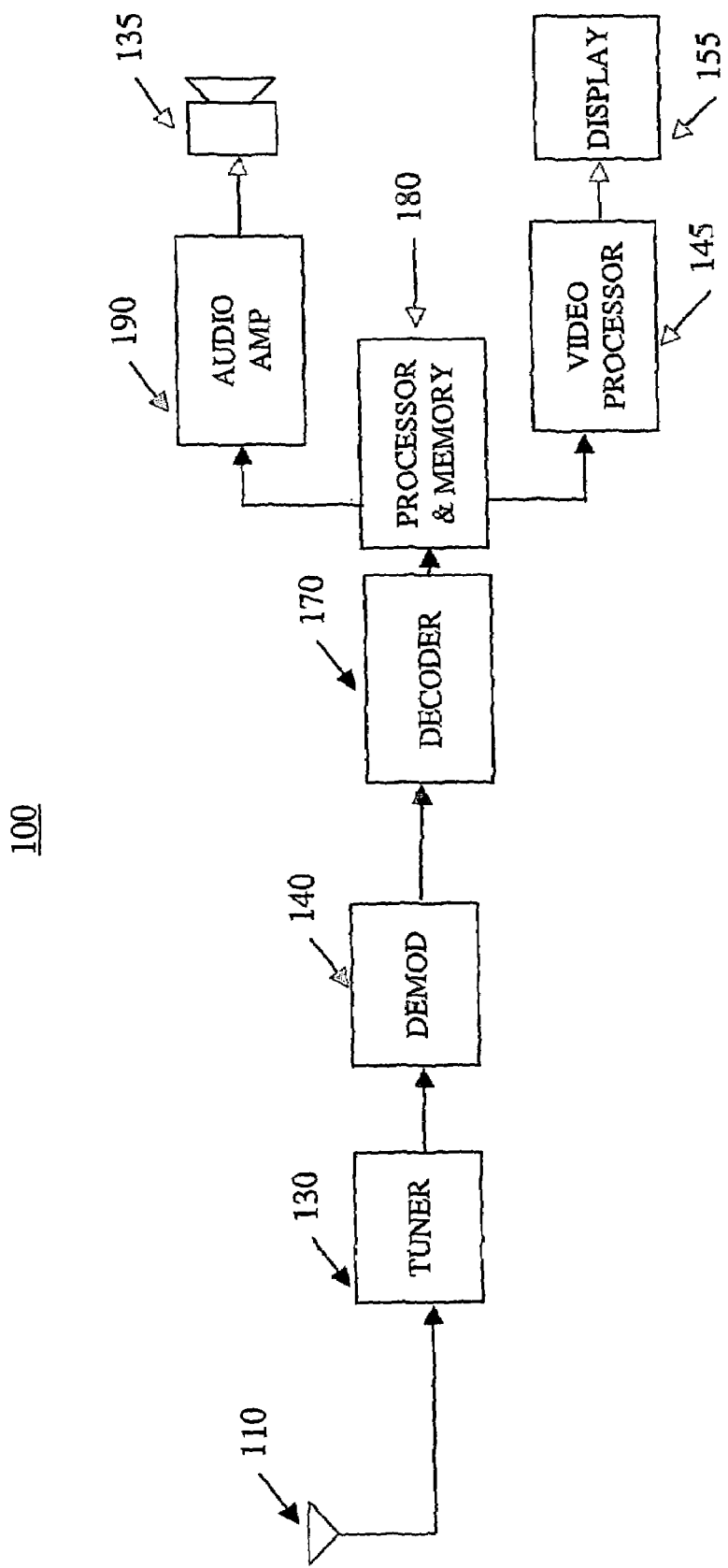
FIG. 1 is a block diagram of a television signal processing apparatus according to an exemplary embodiment of the present invention.

Referring to FIG. 1, a block diagram of an exemplary embodiment of television signal processing apparatus 100 of FIG. 1 is shown. In FIG. 1, television signal processing apparatus 100 comprises signal receiving means such as signal receiving element 110, tuning means such as tuner 130, demodulation means such as demodulator 140, decoding means such as decoder 170, processing means and memory means such as processor and memory 180, audio amplification means such as audio amplifier 190, audio output means such as speaker 135, video processing means such as video processor 145, and visual output means such as display 155, a power supply 125 and a switch 115 responsive to the processor and memory 180. Some of the foregoing elements may for example be embodied using integrated circuits (ICs). For clarity of description, certain conventional elements of television signal processing apparatus 100 including control signals may not be shown in FIG. 1. According to an exemplary embodiment, television signal processing apparatus 100 may receive and process signals in analog and/or digital formats.

Signal receiving element 110 is operative to receive signals including audio, video and/or auxiliary data from signal sources, such as radio frequency broadcast signal transmission sources, or cable television transmission. Signal receiving element 110 may be embodied as any signal receiving element such as an antenna, input terminal or other element.

Tuner 130 is operative to tune signals including audio, video and/or auxiliary data signals. Accordingly, tuner 130 may tune signals for the main picture of television signal processing apparatus 100. According to an exemplary embodiment, television signal processing apparatus 100 may further include a picture-in-picture (PIP) function wherein the first channel includes audio and/or video signals for a main picture, and a second channel (not shown) includes audio and/or video signals for the PIP function. Demodulator 140 is operative to demodulate signals provided from tuner 130, and may demodulate signals in analog and/or digital transmission formats.

Decoder 170 is operative to decode signals including audio, video and/or auxiliary data signals provided from the demodulator 140. According to an exemplary embodiment, decoder 170 decodes digital data that represents program guide data or emergency alert signals indicating an emergency event. Decoder 170 may also perform other decoding functions, such as decoding data which represents auxiliary data signals included in the vertical blanking interval (VBI) of an analog television signal.

Processor and memory 180 are operative to perform various processing, control, and data storage functions of television signal processing apparatus 100. According to an exemplary embodiment, processor 180 is operative to process the audio and video signals provided from decoder 170, and may for example perform analog processing, such as National Television Standards Committee (NTSC) signal processing and/or digital processing, such as Motion Picture Expert Group (MPEG) processing.

The processor and memory 180 is also operative to receive the auxiliary data signals from decoder 170 and determine what actions are required based on the auxiliary data received. For example, if EPG data is received, the processor 180 may decide to sort the EPG data and store the data in the processor's associated memory 180. If the processor 180 receives auxiliary data associated with the emergency alert function of television signal processing apparatus 100, it may compare data in the emergency alert signals to user setup data stored in memory 180 to determine whether the emergency alert function is activated to activate emergency alert signals.

Audio amplifier 190 is operative to amplify the audio signals provided from processor 180. Speaker 135 is operative to aurally output the amplified audio signals provided from audio amplifier 190.

Video processor 145 is operative to process the video signals provided from processor 180. According to an exemplary embodiment, such video signals may include information based on the data contained in the received auxiliary data signals such as EPG information or emergency alert information. Video processor 145 may include closed caption circuitry that enables closed caption displays. Display 155 is operative to provide visual displays corresponding to processed signals provided from video processor 145.

Figure 2:
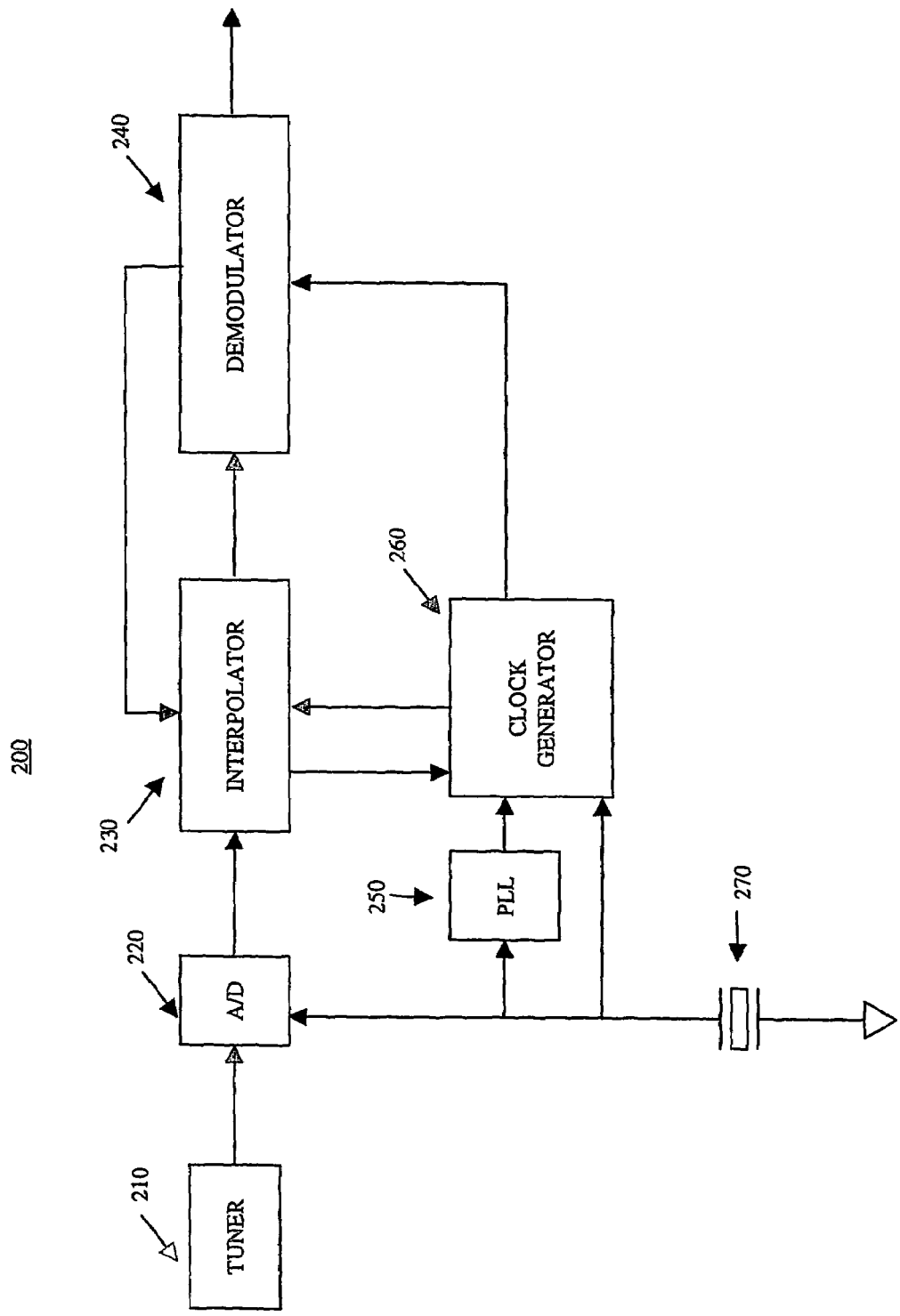
FIG. 2 a block diagram of an exemplary embodiment of digital signal processing circuitry utilizing an A/D converter operating according to a fixed rate sampling mode concurrently with subsequent signal processing circuitry operating according to a synchronous sampling mode.

Referring to FIG. 2, a block diagram of an exemplary embodiment of digital signal processing circuitry 200 comprising A/D converter 220 operating according to a fixed rate sampling mode concurrently with subsequent signal processing circuitry, such as a demodulator 240, operating according to a synchronous sampling mode is shown. The digital signal processing circuitry further comprises a tuner 210, interpolator 230, clock generator 260, and phase locked loop (PLL) 250 as well as a fixed rate clock 270.

In this exemplary embodiment shown in FIG. 2, the tuner 210 outputs an intermediate frequency (IF) analog signal. The A/D converter 220 takes samples of the IF analog signal at a fixed sampling rate. These fixed rate samples are taken at times corresponding to the digital clock signal input into the AND converter 220 by the fixed rate clock 270. The fixed rate samples are read at the fixed rate by the interpolator 230 and a discrete number of samples are stored by the interpolator 230, the number of samples depending on the interpolation method used by the interpolator 230.

The interpolated samples are then interpolated to yield samples at the symbol rate or some integer multiple thereof in the Interpolator 230 based on the rate control signal from the demodulator 240. In a synchronous sampling mode of operation, the rate control signal might have originally been used to control the frequency of a voltage controlled oscillator (VCXO). As such, the interpolator 230 is designed such that its rate control input has the effect of mimicking the effect of this rate control signal going to a VCXO on the data samples delivered to demodulator 240. The interpolator 230 operates using the fixed rate clock 270, whereas the demodulator 240 runs on a burst clock generated by the clock generator 260. The burst clock is enabled by the interpolator 230 when there are samples in the interpolator 230 ready to be processed by the demodulator 240. There may be more than one clock frequency generated by the clock generator 260 going to the demodulator 240 and subsequent synchronous sampling mode circuitry. All of these clocks are allowed to run for 1 symbol of time for every symbol extracted from the interpolator 230. For example, a clock running at 8 times the symbol rate would be allowed to run for 8 periods for every symbol taken from the interpolator 230.

Figure 3:
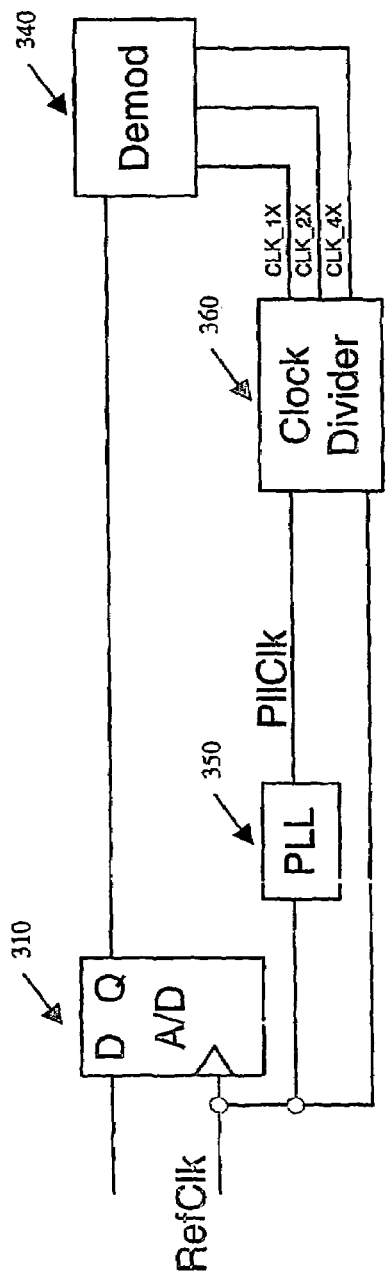
FIG. 3 a block diagram of clock generator circuitry according to an exemplary embodiment of the present invention.

Referring to FIG. 3, a block diagram of clock generator circuitry 300 according to an exemplary embodiment of the present invention is shown. In FIG. 3, the clock generator circuitry 300 comprises an AND converter 310, a PLL 350, a clock divider 360, and a demodulator 340. The clock divider 360 is used to synchronize the clock generated by the PLL and the reference clock, which is further explained in the discussion of FIG. 4, as well as creating multiple integers of the synchronized clock signal to be used by subsequent signal processing circuitry.

Figure 4:
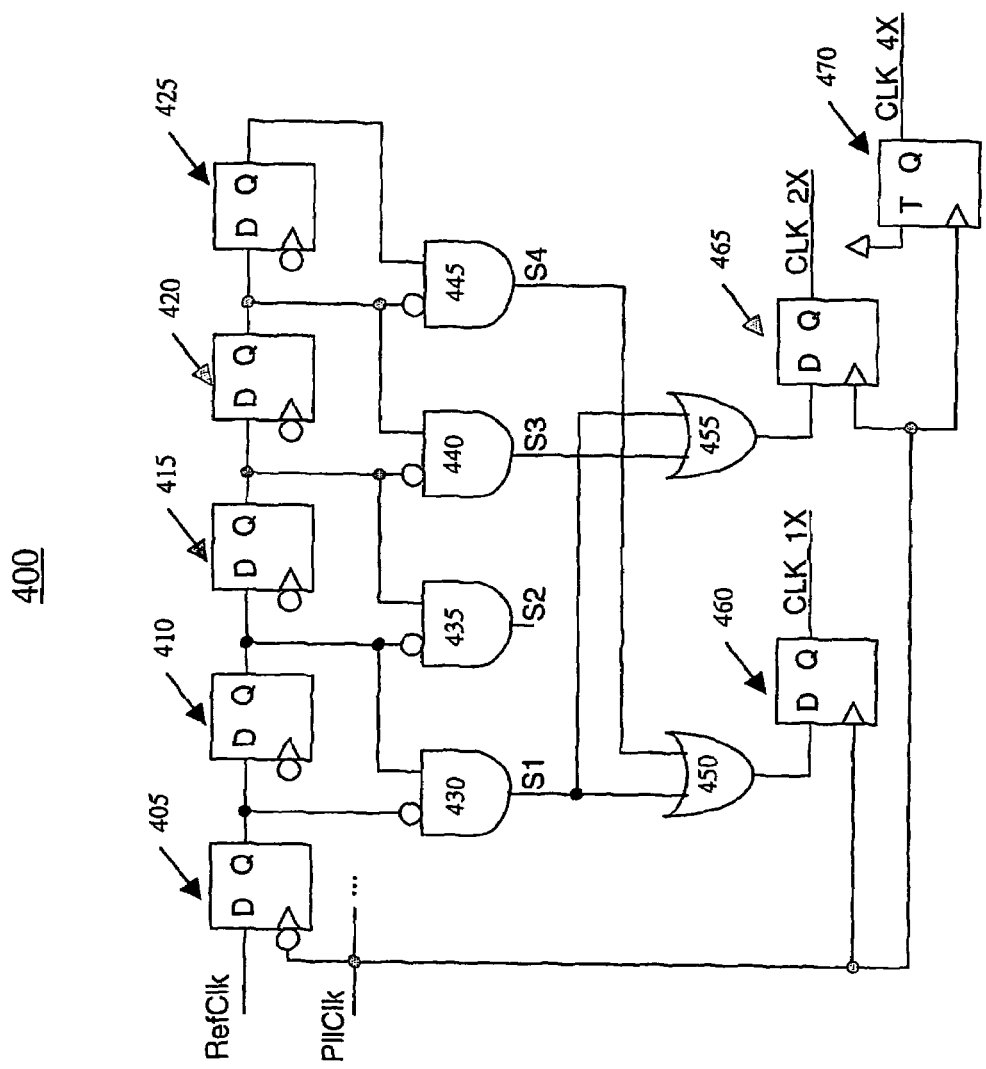
FIG. 4 is a diagram of a clock divider circuitry of a clock generator according to an exemplary embodiment of the present invention.

Referring to FIG. 4, a diagram of a clock divider circuitry 400 of a clock generator according to an exemplary embodiment of the present invention is shown. In FIG. 4, the clock divider circuitry 400 comprises a plurality of D flip-flops 405, 410, 415, 420, 425, 460, 465, 470, a plurality of AND gates 430, 435, 440, 445, a plurality of OR fates 250, 255. In the exemplary embodiment of the present invention shown in FIG. 4, five D flip-flops 405, 410, 415, 420, and 425 are used to create a delay line for the reference clock. The PLL clock is used to advance the state of the delay line. The group of logic elements comprising the AND gates 430, 435, 440, 445 and the OR gates 450, 455 are used as a means for comparing the various output stages of the delay line 405, 410, 415, 420, 425. For example, to generate the 1× clock, the state of the outputs of the first D flip-flop 405, the second D flip-flop 410, the fourth D filp-flop 420, and the fifth D flip-flop are compared using the group of logic elements 430, 435, 440, 445, 450, 455. The 1× clock is then passed through a final D flip-flop 460 to complete the synchronization of the reference clock with the PLL clock.

Figure 5:
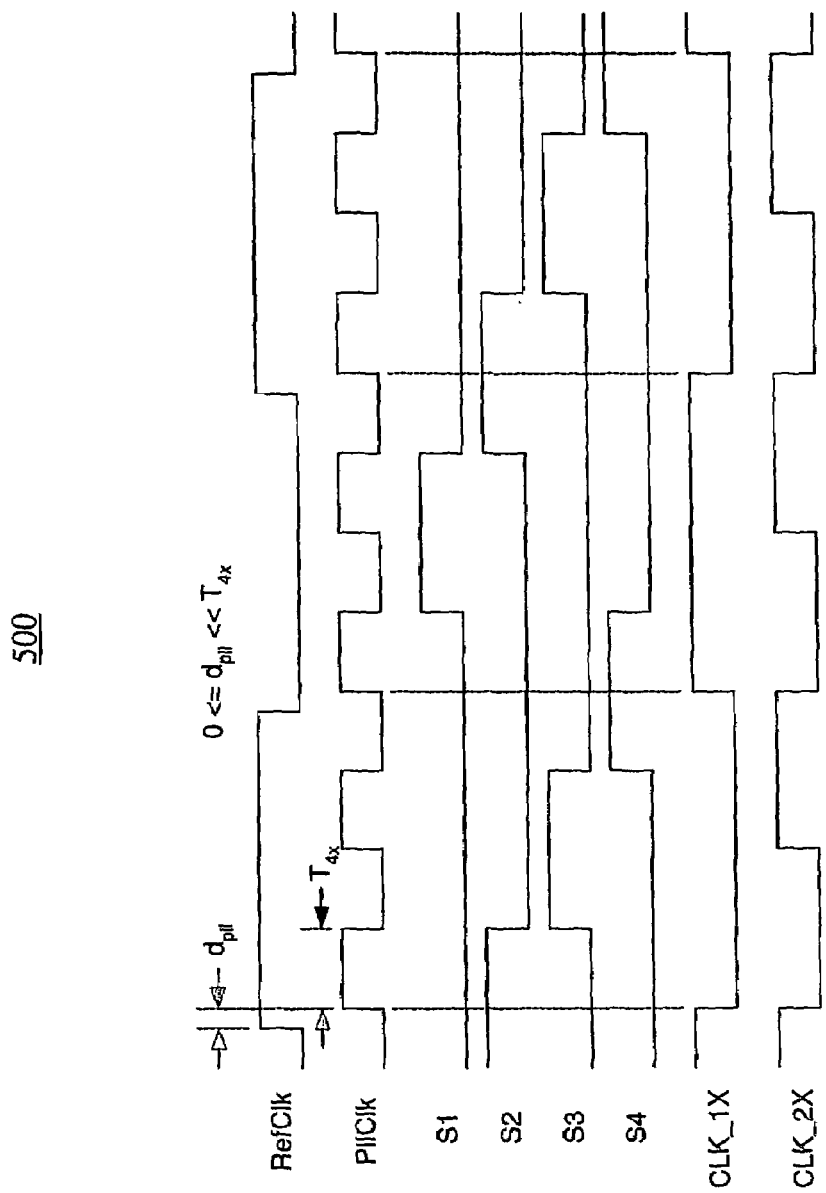
FIG. 5 is a timing diagram of the clock divider circuitry according to an exemplary embodiment of the present invention.

Referring to FIG. 5, a timing diagram of the clock divider circuitry according to an exemplary embodiment of the present invention is shown. The timing diagram shown represents the signal state at indicated points on the clock divider circuitry of FIG. 4 400.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A signal processing apparatus comprising:
a source of a fixed rate digital signal;
a signal processor responsive to a burst clock generated by a clock generator, said signal processor operating in a synchronous-sampling mode for producing a control signal representing a symbol rate; and
an interpolator operated using a fixed rate clock and responsive to said control signal for processing the fixed rate digital signal to yield samples at the symbol rate by calculating a symbol value at a symbol location by interpolating a number of fixed rate samples adjacent to said symbol location and outputting the samples to the signal processor, and said interpolator being further operative to enable said burst clock in response to said samples at the symbol rate being ready to be processed by said signal processor.

2. The signal processing apparatus of claim 1 wherein the interpolator processes the fixed rate digital signal to yield samples at the symbol rate by calculating a symbol value at a symbol location by interpolating a number of fixed rate samples adjacent to the symbol location.

3. The signal processing apparatus of claim 1 wherein the source of the fixed rate digital signal is an analog to digital converter.

4. The signal processing apparatus of claim 1 wherein the interpolator is a cubic interpolator.

5. The signal processing apparatus of claim 1 wherein the interpolator is a linear interpolator.

6. The signal processing apparatus of claim 1 wherein the interpolator is a piecewise parabolic interpolator.

7. The signal processing apparatus of claim 1 wherein the interpolator is internal to an integrated circuit.

8. The signal processing apparatus of claim 1 wherein the interpolator is implemented using software.

9. A method of signal processing comprising the steps of:
receiving a plurality of digital values at a fixed rate of time;
receiving a control signal representing a symbol rate from a signal processor operating in a synchronous-sampling mode, said signal processor being responsive to a burst clock generated by a clock generator;
calculating a signal level at a symbol location using an interpolator responsive to said control signal by interpolating the signal level from the plurality of digital values of a number of fixed rate samples adjacent to said symbol location to yield samples at the symbol rate, wherein said interpolator operated using a fixed rate clock; and
enabling said burst clock in response to said samples at the symbol rate and said calculated signal level being available to said signal processor.

10. The method of claim 9 wherein the control signal from the signal processor is a symbol rate.

11. The method of claim 9 wherein the source of the plurality of digital values at a fixed rate of time is an analog to digital converter.

12. The method of claim 9 wherein the step of calculating a signal level by interpolating the signal level from the plurality of digital values is preformed using a cubic interpolator.

13. The method of claim 9 wherein the step of calculating a signal level by interpolating the signal level from the plurality of digital values is preformed using a linear interpolator.

14. The method of claim 9 wherein the step of calculating a signal level by interpolating the signal level from the plurality of digital values is preformed using a piecewise parabolic interpolator.

15. A signal processing apparatus comprising:
a source of an analog signal;
an analog to digital converter for converting the analog signal to a fixed rate digital signal;
a demodulator operating in a synchronous-sampling mode;
a processor responsive to a burst clock generated by a clock generator, said processor operative for producing a control signal representing a symbol rate; and
an interpolator operated using a fixed rate clock and responsive to said control signal for processing the fixed rate digital signal to yield samples at the symbol rate by calculating a symbol value at a symbol location by interpolating a number of fixed rate samples adjacent to said symbol location and outputting the samples to the demodulator, and said interpolator being further operative to enable said burst clock in response to said samples at the symbol rate being ready to be processed by said signal processor.

16. The signal processing apparatus of claim 15 wherein the interpolator is a cubic interpolator.

17. The signal processing apparatus of claim 15 wherein the interpolator is a linear interpolator.

18. The signal processing apparatus of claim 15 wherein the interpolator is a piecewise parabolic interpolator.

19. The signal processing apparatus of claim 15 wherein the interpolator is internal to an integrated circuit.

20. The signal processing apparatus of claim 15 wherein the interpolator is implemented using software.

* * * * *

UNITED STATES PATENT AND TRADEMARK OFFICE
CERTIFICATE OF CORRECTION

PATENT NO. : 7,583,802 B2 Page 1 of 1
APPLICATION NO. : 10/542433
DATED : September 1, 2009
INVENTOR(S) : Aaron Reel Bouillet It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1042 days.

Signed and Sealed this

Fourteenth Day of September, 2010

David J. Kappos
*Director of the United States Patent and Trademark Office*